O. W. NOTTINGHAM.
FEED MILL.
APPLICATION FILED MAR. 24, 1914.
1,190,793.
Patented July 11, 1916.
2 SHEETS—SHEET 2.
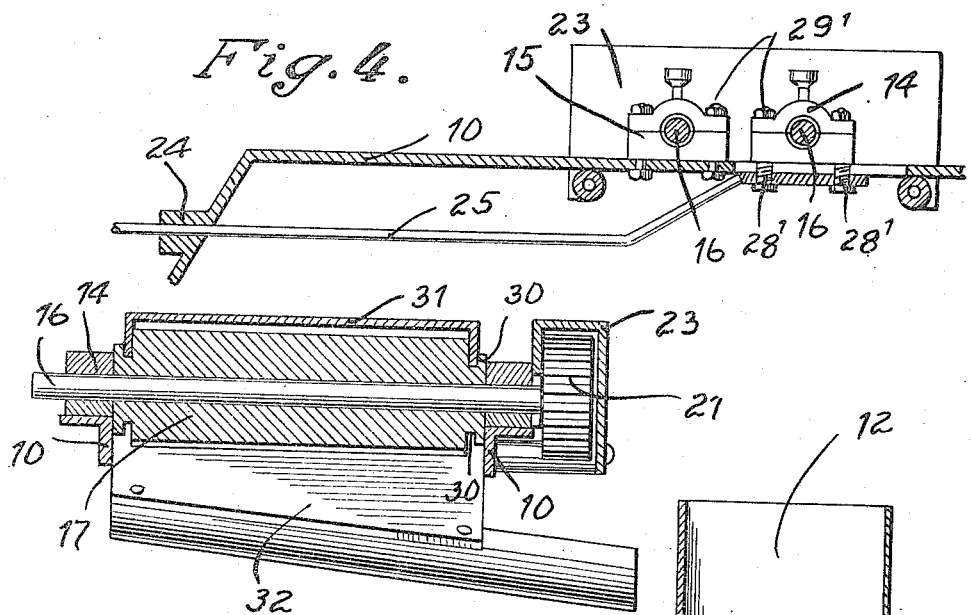
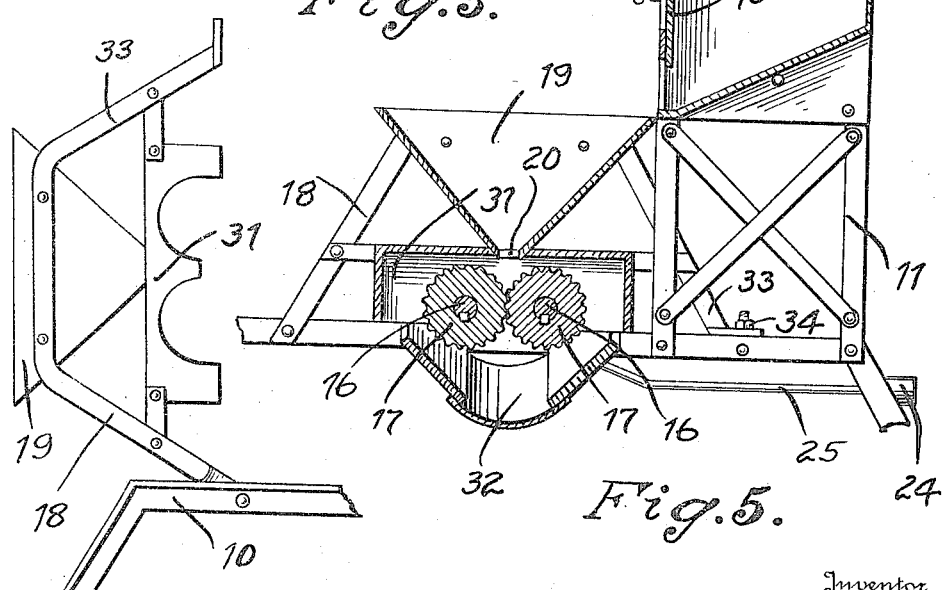
Witnesses
M. S. Watson
Harry M. Test
Inventor
O. W. Nottingham
By
Attorneys

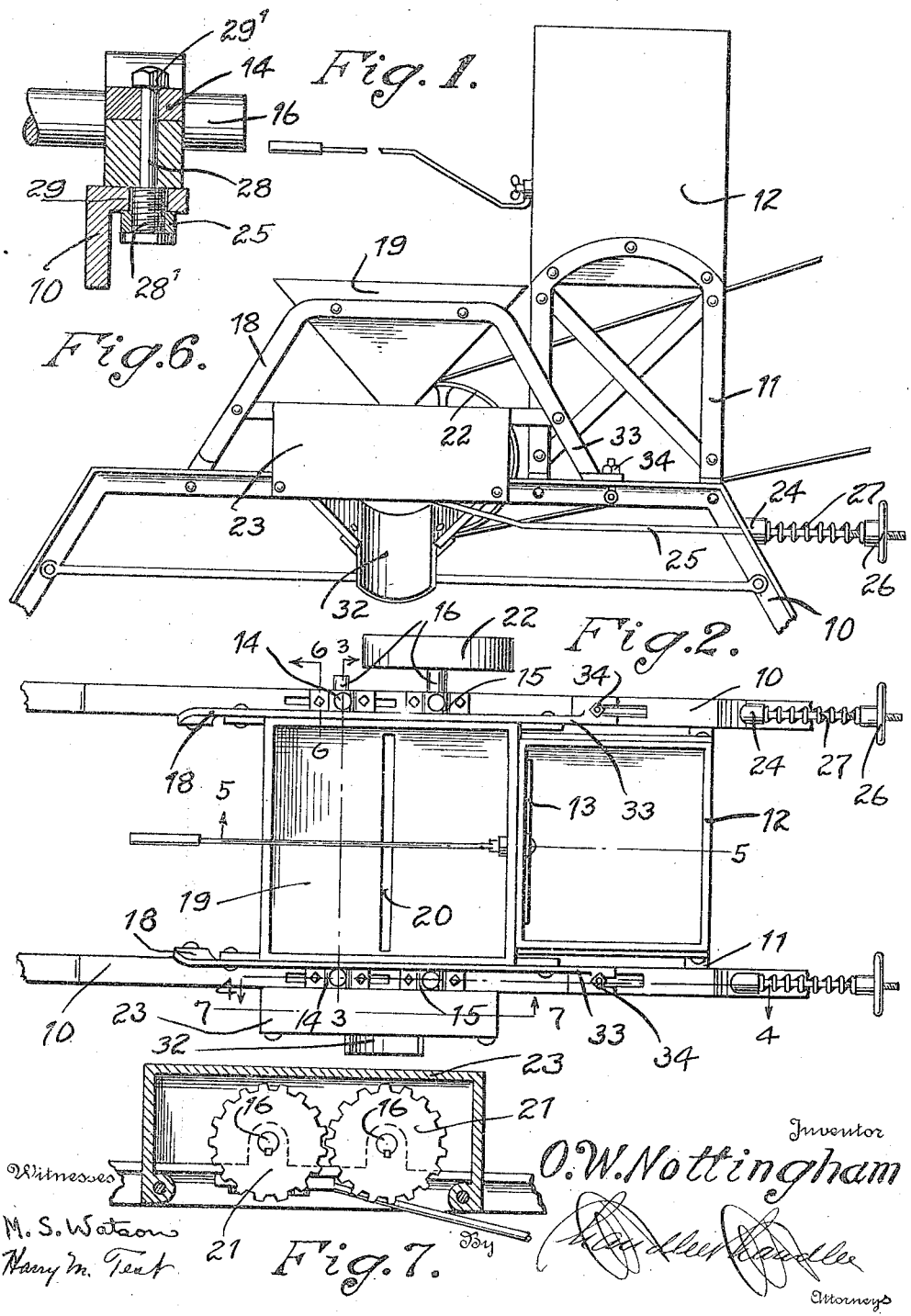

UNITED STATES PATENT OFFICE.

ORIA W. NOTTINGHAM, OF SHONKIN, MONTANA.

FEED-MILL.

1,190,793.

Specification of Letters Patent.

Patented July 11, 1916.

Application filed March 24, 1914. Serial No. 826,887.

*To all whom it may concern:*

Be it known that I, ORIA W. NOTTINGHAM, a citizen of the United States, residing at Shonkin, in the county of Chouteau, State of Montana, have invented certain new and useful Improvements in Feed-Mills; and I do hereby declare the following to be a full, clear, and exact description of the invention, such as will enable others skilled in the art to which it appertains to make and use the same.

This invention relates to improvements in grinding mills, and particularly to mills for grinding feed.

One object of the invention is to provide a simple and efficient device of this character which will thoroughly crush the grain with the minimum power and within shorter space of time than heretofore.

Another object is to provide a device of this character in which the tension of the crushing rolls can be quickly and easily regulated.

A further object is to provide a device of this character which will prevent the grain being thrown by the rolls resulting in loss of the crushed grain.

Other objects and advantages will be apparent from the following description, when taken in connection with the accompanying drawings.

In the drawings: Figure 1 is a side elevation of a machine made in accordance with my invention. Fig. 2 is a top plan view. Fig. 3 is a vertical transverse sectional view on the line 3—3 of Fig. 2. Fig. 4 is a vertical longitudinal sectional view on the line 4—4 of Fig. 2. Fig. 5 is a vertical longitudinal sectional view on the line 5—5 of Fig. 2. Fig. 6 is a detail sectional view on the line 6—6 of Fig. 2. Fig. 7 is a vertical section on the line 7—7 of Fig. 2. Fig. 8 is a side elevation of a portion of the frame and tilting trough.

Referring particularly to the accompanying drawings, 10 represents a suitable supporting frame at one end of which is mounted a vertical frame 11, said frame carrying a suitable hopper 12. This hopper is provided with a vertically sliding door 13 for regulating the flow of material from the hopper. Mounted on the frame 10 adjacent the support 11 are the journal bearings 14 and 15 in which are rotatably mounted the ends of the shafts 16 of the crushing rolls 17. Pivotally mounted on the frame 10 adjacent one of the rolls 17 are the upwardly directed inclined arms 18, the upper ends of said arms carrying a delivering trough 19. The trough tapers toward the lower end from two sides, and has a slot 20 which is disposed directly over a point between the rolls. This trough is arranged in position to receive the grain as it issues from the hopper 12, and delivers it to the crushing rolls. These crushing rolls are longitudinally corrugated, and are so arranged that the corrugations of one roll mesh with those of the other roll. The shafts of the rolls carry intermeshing gears 21 which cause the rolls to rotate toward each other at the same speed. The other end of one of the shafts carries a pulley 22 which receives power from any suitable source to drive the rolls.

Arranged over the gears, and secured to the frame 10 is a suitable protective casing 23 which prevents the clothing of the operator from being caught.

At one end of the frame are mounted the guides 24 through which are slidably disposed the rods 25. These rods carry on their outer ends suitable hand knobs 26, and on the rods between the guides and the knobs are coil springs 27. The other end of each of the rods is connected to one of the journal bearings 14 of the rolls by means of the bolts 28, these bolts extending upwardly through slots 29 in the frame 10 whereby the said journal bearings can be moved so as to increase or decrease the tension between the rolls. The beforementioned knob 26 is threaded onto the end of the rod, and by turning this knob, the tension of the spring 27 can be increased or decreased as desired. Thus when any hard substance comes between the rolls the rolls will spread apart against the tensions of the springs 27 so as to prevent injury to the rolls.

Detachably secured to the frame 10 below the hopper 12 are the inclined arms 33, these arms being secured at their upper ends to the trough 19. These arms 33 are secured to the frame by the swinging bolts 34, so that the arms can be quickly released from the frame and the trough swung from over the rolls on the pivotal connection between the arms 18 and the frame. This provides access to the rolls to clean them or for removing any foreign matter.

Each of the rolls has a slightly reduced and circumferentially grooved extension 30 at each end, and carried by the frame, and slidably engaging these grooves are the guard or shield 31. This guard or shield is especially designed to prevent the material from being thrown off by the rolls. Below the rolls and suspended on the frame 10 is a transversely extending chute 32 which is arranged to convey the crushed grain which has passed through the rolls, to a suitable point of collection. The bolts 28 are provided with the threaded enlargements 28' which are screwed into the threaded openings in the rods 25, the shanks passing through the slots 29 and the journal bearings where they receive the clamping nuts 29'.

What is claimed, is:—

In a grinding mill, a frame, crushing rollers associated with the frame, inverted U-shaped arms having one of their ends pivotally connected to the frame, a hopper supported by the arms and movable therewith, and guard plates fixed to the arms and normally engaged with the ends of the rollers.

In testimony whereof, I affix my signature, in the presence of two witnesses.

ORIA W. NOTTINGHAM.

Witnesses:
H. O. PHELPS,
JAS. HARSON.

Copies of this patent may be obtained for five cents each, by addressing the "Commissioner of Patents, Washington, D. C."